United States Patent [19]

Mercuri

[11] Patent Number: 5,712,007
[45] Date of Patent: Jan. 27, 1998

[54] TUBULAR CASING FOR FOOD PRODUCTS

[76] Inventor: Enrico Mercuri, 2 Penna Avenue, Glynde, Australia

[21] Appl. No.: 501,105

[22] PCT Filed: Feb. 18, 1994

[86] PCT No.: PCT/AU94/00076

§ 371 Date: Oct. 31, 1995

§ 102(e) Date: Oct. 31, 1995

[87] PCT Pub. No.: WO94/18843

PCT Pub. Date: Sep. 1, 1994

[30] Foreign Application Priority Data

Feb. 19, 1993 [AU] Australia ............................ PL7378

[51] Int. Cl.[6] ........................... B65D 81/34; A22C 13/00
[52] U.S. Cl. .................. 428/34.8; 428/36.1; 138/118.1; 138/123; 138/124; 66/178 R; 66/201; 66/202
[58] Field of Search ...................... 428/34.8, 36.1; 138/118.1, 123, 124; 66/178 R, 201, 202

[56] References Cited

U.S. PATENT DOCUMENTS 2,289,302  7/1942  Bradshaw.
5,413,148  5/1995  Mintz et al.

FOREIGN PATENT DOCUMENTS 46595168   11/1973   Australia.
10054/76   12/1978   Australia.
662543 A5  10/1987   Switzerland.

OTHER PUBLICATIONS

Fairchild's Dictionary of Textiles. Ed. by Dr. I.B. Wingate, Fairchild Publications, New York, 1959.
The English translated document of C4 662543.
Introductory Textile Science by M.L. Joseph, 5th edition Holt, Reinhat and Winston, New York pp. 242–244.
Fairchild's Dictionary of Textiles, ed. by Wingate Fairchild Publication, Inc., New York pp. 602–603.

*Primary Examiner*—Kathleen Choi
*Attorney, Agent, or Firm*—Evenson, McKeown, Edwards & Lenahan

[57] ABSTRACT

This invention relates to a tubular casing for location around food products prior to cooking or curing that produce a quilted-like surface pattern to the surface of the food product. The invention comprises a first tubular portion that is knitted in continuous lengths such that the wall of the first tubular portion is stretchable, and circumferential and longitudinal threads secured to the surface of the first tubular portion that become taut as food product is located within the first tubular portion such that a quilted surface pattern is applied to the surface of the product.

5 Claims, 2 Drawing Sheets

TUBULAR CASING FOR FOOD PRODUCTS

This application is a 371 national stage application of PCT/AU94/00076 filed Feb. 18, 1994.

FIELD OF THE INVENTION

This invention relates to an improved tubular casing for food products, and in particular relates to a tubular casing which will produce a desired quilted-like surface pattern to the surface of the respective food product.

BACKGROUND OF THE INVENTION

In the following description, the terms "casing", food product" and "netting" shall have the following meanings:

"Casing" any synthetic or natural tubular material used in the processing of food products such as meat products.

"Food product" any fresh or processed food products, and in particular fresh or processed meat products.

"Netting" any knitted, woven, extruded or otherwise manufactured packaging netting whether elasticated, rigid or laterally extendable.

In the manufacture of food products, and in particular in respect of the manufacture of meat products, natural or artificial casings in the form of elongated tubes are normally either pumped full of meat from a machine specifically designed for the purpose, or have portions of meat placed within the tube prior to either a cooking or curing process.

Machines which deal with minced meat product normally comprises a feed mechanism for injecting meat through a delivery tube or injection horn, where the casing is shirred onto the external surface of the delivery tube. A clip or other closure means is placed over the ends of the casing, and a quantity of meat is then injected into the casing.

Depending upon desired length of the meat product, the process is interrupted at various stages so that clips or twists may be applied so as to separate the meat product into individual portions.

In addition, whole meat portions may likewise be inserted within the tubular casing, and in this instance, stuffing tubes or horns are also used which enable the tubular casing to be stretched, whereupon meat portions can be readily introduced within the tubular casing.

It is normal to make use of artificial skins such as collagen based casings or fibrous casings and such casings are produced in a variety of wall thickness, and the production rate, injection pressure and forces applied will determine the thickness of the casing that is used.

The thinner walled casings are generally unsatisfactory for high production rate machines. These machines operate at much higher injection pressures, and thinner casings will split at higher pressures.

However, as the thicker walled casings are much more expensive, there is a tendency to use the thinner walled casings and to reduce the injection pressure and therefore production rate of the injection machinery. Although there is a reduced costs in consumables, there is also a correspondingly lower production rate.

Therefore, it is one object of the present invention to provide an improved casing which overcomes the above-mentioned problems, and which provides a casing capable of withstanding higher production rate injection pressures.

In addition to the use of plain collagen type tubular casings, it is also common to make use of additional netting that is placed over the outside surface of the collagen once the food product is located within the casing.

In many instances, the netting is used purely for a decorative effect and remains in place prior to consumption of the food product. In addition to providing a decorative effect, the netting, if properly sized, can be used to produce a surfaced patterning effect. In this instance, the longitudinal and circumferential members of the net apply a force to the surface of the meat product, and provided that the surface of the food product is sufficiently pliable, then the netting will protrude into the surface of the food product. This results in a quilt-like surface pattern, where the circumferential and longitudinal members are depressed within the surface of the food product, and where the food product bulges outwardly between the longitudinal and circumferential members.

In many cases, the provision for a quilted surface pattern is a very desirable effect, even in the case where the tubular casing is removed after the cooking or curing phase. In these instances, it is desirable for the tubular casing to pull cleanly away from the surface of the food product, without removing chunks or portions of the food product, so as to produce a clean quilt-like surface pattern. The food product is then packaged in alternative packing material such as shrink-style packing or clear wrap. Alternatively, the tubular casing may be used over the top of an existing casing or may be left on the product. In both cases, the desirable quilt-like surface pattern is still produced.

Therefore, it is a further object of this invention to provide a tubular casing which is capable of producing a desirable quilt-like surface pattern on food products, and which is readily removed from the surface of the product, or which may be left on the product, or may be used in conjunction with existing casings.

It is desirable that the tubular casing be knitted in a manner which does not result in threads unravelling or runs occurring when one or other of the threads break. It is common for knitted tubes, such as stockings to come apart if one thread breaks. This is not desirable, and where ever possible, the tubular casing is knitted so that integrity of the tube and other members is maintained despite minor damage or thread breakage.

It is also desirable, particularly in relation to cooking processes, to minimise the loss of weight through evaporation or run-off of fluids, particularly from meat based products. As collagen casings provide a relatively impermeable barrier to fluids, there is a high weight retention during the cooking process. It has generally been thought that the use of fluid porous tubular casing will result in rapid loss of fluids during the cooking process with a resultant weight loss for the product.

SUMMARY OF THE INVENTION

However, the inventor of the present application have found that by use of a porous casing material which is fine enough to hold substantially all the filling within the casing, such as a knitted material, that the surface layers of the meat are cooked at a more rapid rate which results in a sealing of the surface and an effective impenetrable barrier which retards fluid and weight loss. By allowing the heating process to more readily and rapidly access the surface layers of the meat product, then a more rapid sealing of the surface takes place than is possible with the impervious collagen type material.

The benefit of the use of a knitted material rather than a collagen style material is that it is more readily removed from the surface of the food product after the cooking process and therefore less damage occurs no the surface of the product.

Therefore, it is a further object of this invention to make use of a knitted tubular casing which provides the above-mentioned advantages.

In its broadest form, the invention comprises a tubular casing for location around food products prior to cooking or curing comprising a first tubular portion that is knitted in continuous lengths such that the wall of the first tubular portion is stretchable, and circumferential and longitudinal threads secured to the surface of said first tubular portion that become taut as the food product is located within said first tubular portion such that a quilted surface pattern is applied to the surface of the food product.

Preferably, the circumferential and longitudinal threads are incorporated into the first tubular portion as it is being knitted, and for efficient knitting, the circumferential and longitudinal threads may be discontinuous in that they comprise a single or double strand stitch where each circumferential thread comprises a plurality of single or double strand stitches extending between each said longitudinal thread, and each longitudinal thread also comprises a plurality of single or loop stitches extending between each said circumferential threads.

Preferably the knitting process comprises a number of knitting operations which each alternately locate an horizontal and then longitudinal stitch onto the surface of the first tubular portion such that continuous circumferential and longitudinal threads result.

Preferably, the threads are stitched or secured to the first tubular portion only at points of intersection, and preferably the threads are located on the external surface of the first tubular portion, although the invention would be workable with the circumferential and longitudinal threads located on the internal surface of the first tubular portion.

In addition to the abovementioned knitting process, it would also be possible to secure the circumferential threads to the first tubular portion such that a continuous spiral is formed along the length of the first tubular member.

As mentioned above, the first tubular portion is knitted such that it is stretchable, whereas the longitudinal and circumferential threads will reach a point where further stretching will be difficult. At this point, the first tubular member still remains reasonably flexible, enabling some outward stretching within the centre of the grid formed between the longitudinal and circumferential threads. Provided that the longitudinal and circumferential threads are stretched to their substantially inextensible point, and provided that some further pressure is applied by location of the food product within the tubular casing, then these threads will push into the surface of the food product, and the food product will swell or protrude in the regions between the longitudinal and circumferential threads. This will result in the desirable quilted surface pattern being applied to the surface of the food product.

In order to provide the required indentation of both the circumferential and longitudinal threads, it is important that both of these threads become substantially inextensible such that they then protrude into the surface of the meat product located within the casing. This substantial inextensibility may be obtained by either the use of non-elastic threads which become tight at a particular predetermined diameter, or may comprise elasticated threads. In the case of elasticated threads, rather than becoming inextensible, the tension created in the elastic thread as it expands provides sufficient force to force protrusion into the surface of the meat product.

Both the longitudinal and circumferential members may comprise elasticated threads, or there may be a combination of inextensible threads with elasticated threads in combination. However, the invention is not limited to this particular method of manufacture, as the same effect can be obtained with purely inextensible threads. In this example, it is necessary for the required amount of meat product to be placed within the tubular casing such that it is expanded to a predetermined diameter whereupon the desired quilting effect will occur.

Where elasticated circumferential and longitudinal members are used, there is a greater range between the minimum and maximum diameter to which the casing will be expanded while at the same time applying the desired force to produce the quilted appearance.

Preferably, the first tubular portion is knitted using a single jersey stitch and the tubing is knitted such that the normally preferred external surface of the knit is, in fact, on the inside surface of the tube. The single jersey knit produces on one side a surface that is reasonably flat and smooth, whereas the other surface is somewhat more coarse. Obviously, by placing the flatter surface on the inside surface of the casing, this improves the ease by which the casing can be removed from the meat product after the cooking or curing process.

In addition, the stitching process will minimise damage to the filled tubular casing if one of the longitudinal or circumferential threads is broken. If a cord is damaged or broken, the tubular casing should not split.

A variety of different types of materials may be used ranging from single ply polyester in combination with heavy duty elastic thread to other types of material such as cotton, linen, lycra, nylon or any other thread having the required strength and durability. In addition, the first knitted tubular portion may use a thread which becomes transparent when in contact with a moist surface.

BRIEF DESCRIPTION OF THE DRAWING

In order for the invention to be fully understood, preferred embodiments will now be described, but it should be realised that the invention is not to be confined or restricted to the precise details of these embodiments. The embodiments are illustrated in the following diagrams in which.

DESCRIPTION OF THE PREFERRED EMBODIMENTS

Figure 1:
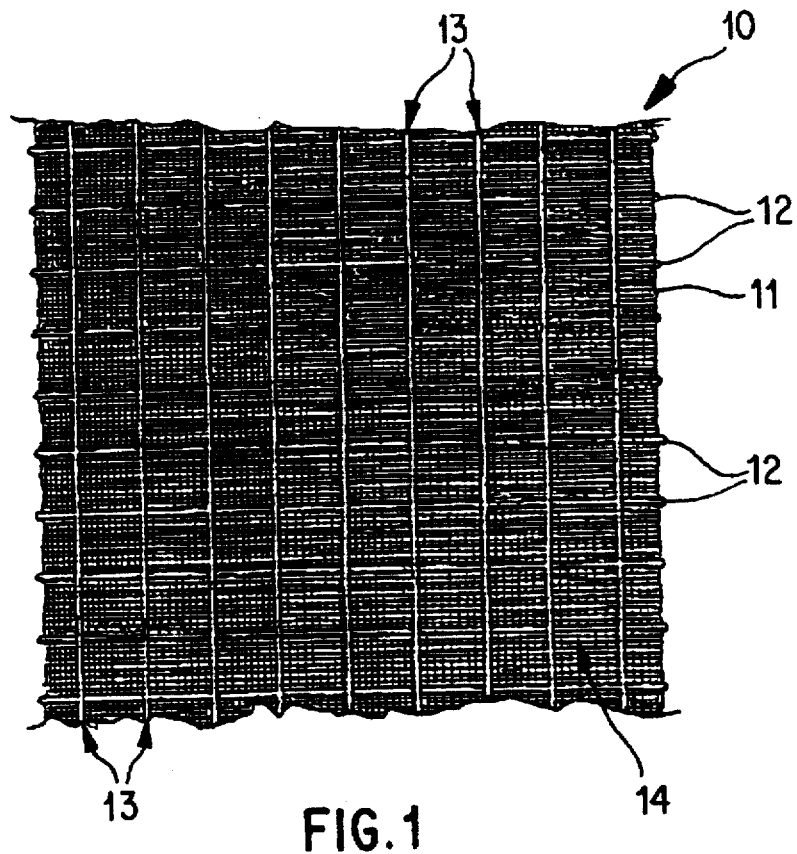
FIG. 1 shows a portion of a tubular casing according to a first embodiment.
Figure 2:
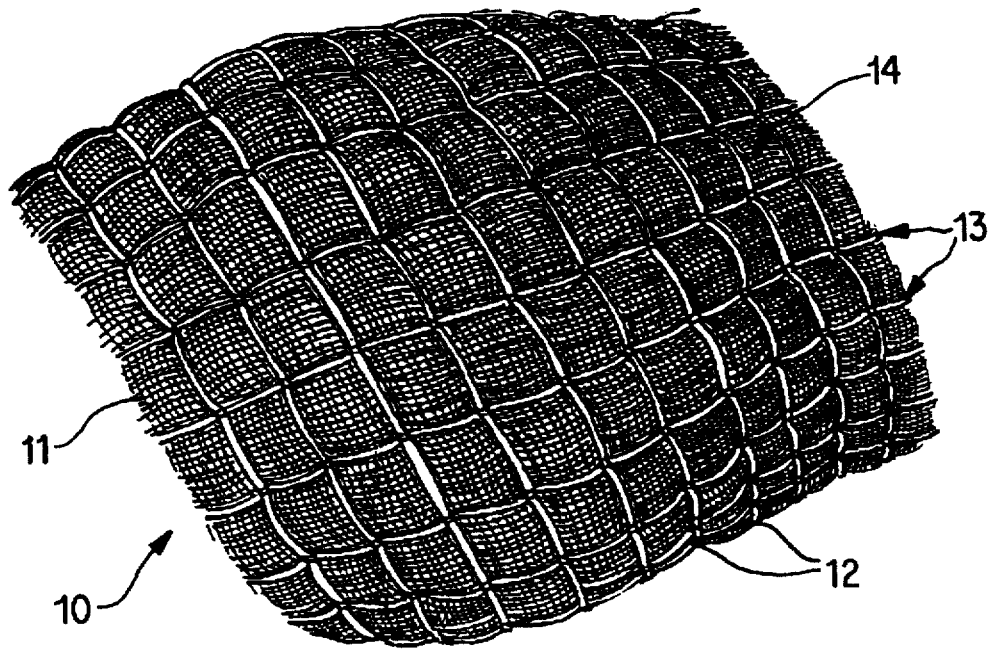
FIG. 2 shows a close up view of a portion of the external surface of the tubular casing according to the first embodiment when it has food product located within to the extent where the circumferential and longitudinal threads become inextensible, and a quilting pattern results.

In the first embodiment shown in FIGS. 1 and 2, a tubular casing 10 comprises a first tubular portion 11 and circumferential threads 12 and longitudinal threads 13. In this embodiment, the tubular casing 10 is formed from a knitting process and the first tubular portion 11 and circumferential threads 12 and longitudinal threads 13 are knitted simultaneously. In this embodiment the material used for the tubular portion 11 comprises polyester thread, and the material used for the circumferential and longitudinal threads 12 and 13 comprises polyester thread. A jersey knit is used to produce the first tubular portion 11, with the smooth surface on the inside of the tubular casing 10, and the circumferential and longitudinal threads 12 and 13 on the outer surface of the tubular casing 10.

The circumferential threads and longitudinal threads 12 and 13 are securely stitched to the first tubular portion 11 and the point of intersection of the circumferential and longitudinal threads 12 and 13. In addition, the knitting process may use a number of stitching points which result in the circumferential and longitudinal threads 12 and 13 comprising a plurality of loop or double strand stitches. Each circumferential thread 12 may comprise a double strand stitch that extends between the longitudinal threads 13, and correspondingly, the longitudinal threads 13 may comprise a plurality of double strand stitches that extend between the circumferential threads. The individual double strand stitches are secured to the first tubular portion 11 at the intersection points with respective circumferential or longitudinal threads 12 and 13.

The knitting process according to the first embodiment results in the plurality of individual stitches that become inextensible at a predetermined diameter, whereupon they are able to press into the surface of the meat product.

As seen in FIG. 2, the inextensibility of both circumferential and longitudinal threads 12 and 13 reach the point when the first tubular portion 11 is still quite stretchable. This results in the circumferential and longitudinal threads 12 and 13 embedding or forcing their way into the surface of the food product whereupon the food product protrudes as a result of the first tubular portion 11 still being stretchable. As seen in FIG. 2, the circumferential and longitudinal threads 12 and 13 form a grid-like pattern with essentially a plurality of square portions 14 between the longitudinal and circumferential threads 12 and 13. When the required amount of food product is located within the tubular casing 10, the circumferential and longitudinal threads 12 and 13 are caused to become inextensible and to embed into the surface of the food product, whereas the food product protrudes within each of the square portions 14. This results in the quilt-like surface pattern being applied to the food product.

Figure 3:
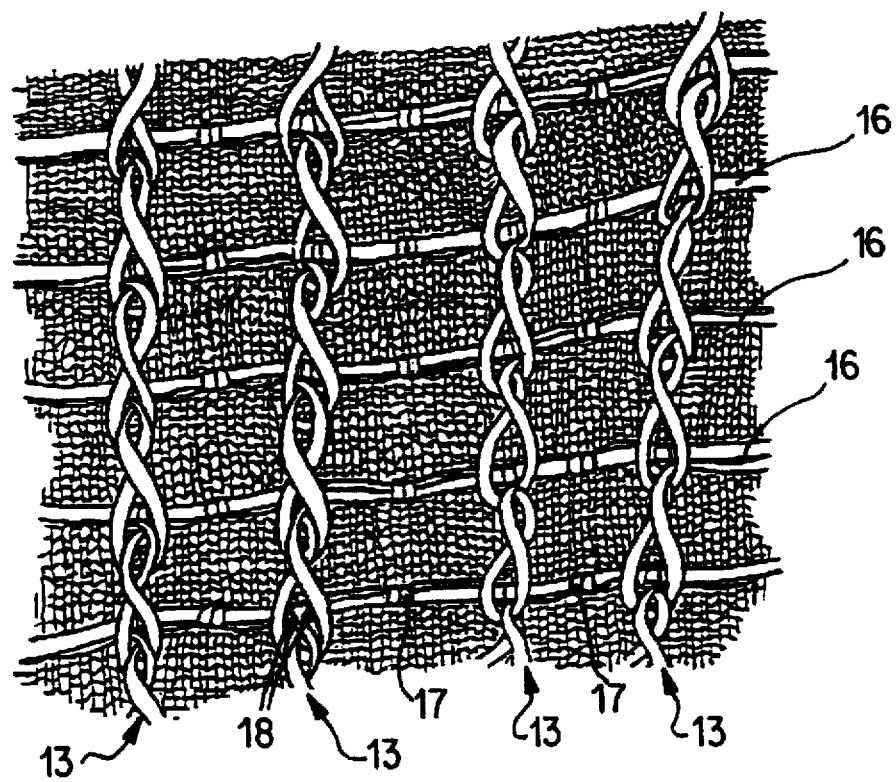
FIG. 3 shows a portion of a tubular casing according a second embodiment.
Figure 4:
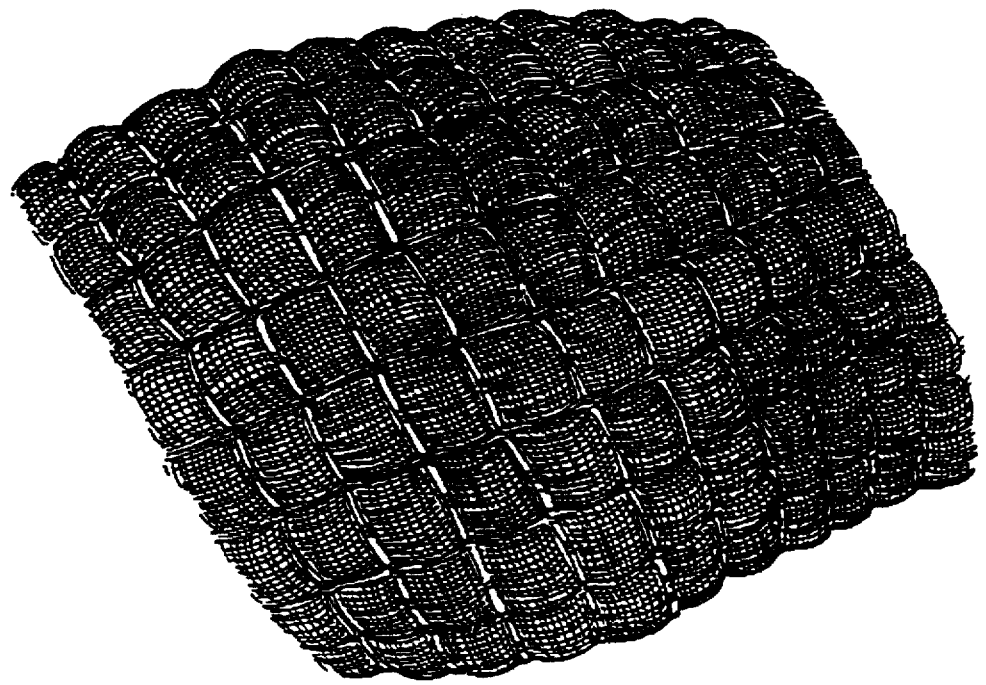
FIG. 4 shows the tubular casing of FIG. 3 in a filled condition.

FIGS. 3 and 4 show a second embodiment of the invention whereupon the circumferential thread is formed from an elasticated member 16, the elasticated thread 16 is attached to the external surface of the first tubular member 11 by tuck stitches 17 and in this embodiment, the elasticated thread 16 is preferably bound in a cotton thread. In this embodiment, the elastic circumferential thread 16 forms a spiral along the length of the first tubular portion 11.

In this second embodiment, the longitudinal threads 13 are formed from a plurality of interengaging loops. The thread that forms the longitudinal thread 13 extends along and is secured to the elastic circumferential thread 16, whereupon it reaches a predetermined point and a loop is formed whereupon the loop extends downwardly and locates around the base of a lower loop and then extends upwardly whereupon it again extends along the elastic circumferential thread 16. As the elastic circumferential thread 16 is a continuous spiral, the longitudinal thread is formed as the knitting of the first tubular portion 11 and placement of the elastic circumferential thread 16 progresses. The longitudinal threads 13 are held in place by tuck stitches 17, and further tuck stitches 18.

The use of the loop form stitch to produce the longitudinal threads 13 means that there is a degree of movement of the stitch before it becomes inextensible. Therefore, the tubular casing 10 is able to expand longitudinally as well as circumferentially before the longitudinal threads 13 begin to impress against the surface of the meat product. In addition, the use of circumferential elasticated members 16 result in these members applying a greater compressive force to the meat product which results in a greater indentation being formed. In addition to the elastic circumferential thread 16 being drawn more deeply into the surface of the meat product, the elastic circumferential threads 16 tend drag the longitudinal threads also further into the surface of the meat product. This results in a more extensive quilting pattern as shown in FIG. 4.

The invention described in accordance with these embodiments are capable of being used in either a cooking or curing process, and it has been found that the woven first tubular portion 11 is readily removed from the surface of the food product once it is cooked or cured. This results in the desired quilted surface pattern remaining in the food product.

I claim:

1. A tubular casing for location around food products prior to cooking or curing comprising, a first knitted tubular portion produced in continuous lengths that forms a first cylindrical wall, said first tubular portion knitted so that it is stretchable and so that it is substantially impermeable to said food products, and circumferential threads and longitudinal threads secured to and spaced along and around an outside surface of said first tubular portion that become taut while said first tubular portion remains stretchable as said food product is located within said first tubular portion so that said circumferential threads and longitudinal threads press into the surface of said food product so that a quilted surface pattern is applied to the surface of said food product, one of said circumferential threads comprising at least one thread secured to said first tubular portion by a plurality of spaced loop stitches that extend out of said first tubular portion and are looped around said circumferential thread to hold said circumferential thread on said outer surface of said first tubular portion and said longitudinal threads comprising a plurality of loop stitches linked together where each loop stitch extends from said circumferential thread to and around a loop stitch on an adjacent circumferential thread.

2. A tubular casing according to claim 1, wherein said longitudinal and circumferential threads are secured to said first tubular portion only at points of intersection between said circumferential threads and said longitudinal threads.

3. A tubular casing according to claim 1, wherein said circumferential threads is secured to said first tubular portion such that it forms a continuous spiral along the length of said first tubular member.

4. A tubular casing according to claim 1, wherein the circumferential thread is an elastic thread.

5. A tubular casing according to claim 1, wherein the first tubular member is knitted using a jersey stitch, wherein the smooth surface of the jersey knit is located on the inside surface of the tubular casing.

* * * * *